(12) United States Patent
Lahti et al.

(10) Patent No.: US 9,505,076 B2
(45) Date of Patent: Nov. 29, 2016

(54) AUXILIARY SHIELDING GAS FILTER FOR A WELDING APPARATUS

(75) Inventors: Thomas Don Lahti, Appleton, WI (US); Jeffery Ray Ihde, Greenville, WI (US); James Francis Rappl, Neenah, WI (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 686 days.

(21) Appl. No.: 13/358,388

(22) Filed: Jan. 25, 2012

(65) Prior Publication Data

US 2013/0186866 A1 Jul. 25, 2013

(51) Int. Cl.
| | |
|---|---|
| *B23K 35/38* | (2006.01) |
| *H05B 6/26* | (2006.01) |
| *H05B 6/64* | (2006.01) |
| *B23K 15/00* | (2006.01) |
| *C21B 3/02* | (2006.01) |
| *B01D 47/00* | (2006.01) |
| *B23K 9/32* | (2006.01) |
| *B23K 37/00* | (2006.01) |

(52) U.S. Cl.
CPC ............... *B23K 9/325* (2013.01); *B23K 37/00* (2013.01)

(58) Field of Classification Search
CPC ...... B23K 9/324; B23K 9/291; B23K 9/296; B23K 9/285; B23K 9/167; H05H 1/34; B01D 46/0098; B01D 46/0004; B01D 46/0005; B01D 46/0008; B01D 46/0084; B01D 46/0095; B01D 46/0097; B01D 2265/027
USPC ............. 219/75, 72, 74, 647, 651, 683, 686, 219/707, 121.33, 121.51, 121.52, 121.53, 219/121.54, 121.55, 137.42; 75/307, 308, 75/323, 327, 332, 341.2, 341.4, 341.7, 75/350.1, 366, 369, 372, 497, 501, 75/DIG. 31; 261/5, 6, 7, 8; 48/189.6; 34/587; 55/418, 420, 422, 503, 504, 55/505, 498; 137/550; 422/120, 122
See application file for complete search history.

(56) References Cited

U.S. PATENT DOCUMENTS

| | | | | |
|---|---|---|---|---|
| 2,294,107 | A | * | 8/1942 | Beck ............................... 48/128 |
| 2,413,991 | A | * | 1/1947 | Newman ....................... 210/457 |
| 4,112,048 | A | * | 9/1978 | Mascher ....................... 423/210 |
| 4,530,817 | A | * | 7/1985 | Holter et al. .................. 422/122 |
| 4,542,267 | A | * | 9/1985 | Christiansen .......... B23K 13/00 219/604 |
| 4,606,260 | A | * | 8/1986 | Cox .......................... A61F 9/06 454/56 |
| 4,633,872 | A | * | 1/1987 | Chaffee .................. A61B 18/20 219/121.75 |
| 4,642,445 | A | * | 2/1987 | Stol ........................ B23K 26/12 219/121.84 |

(Continued)

FOREIGN PATENT DOCUMENTS

JP S56131085 A 10/1981

OTHER PUBLICATIONS

Harris Specialty Gas Equipment, Catalog, Jan. 31, 2008, pp. 30-33, http://www.harrisproductsgroup.com/en/Catalogs.aspx.

(Continued)

*Primary Examiner* — David Angwin
*Assistant Examiner* — Gyounghyun Bae
(74) *Attorney, Agent, or Firm* — Fletcher Yoder P.C.

(57) ABSTRACT

A shielding gas filter assembly for a welding apparatus. The filter assembly includes a filter housing having a filter disposed therein. The filter assembly also includes a filter guard coupled to the filter housing and configured to receive shielding gas. The filter guard includes a tamper resistant portion configured to inhibit an object from contacting the filter when the object is inserted into the filter guard.

20 Claims, 4 Drawing Sheets

(56) References Cited

U.S. PATENT DOCUMENTS

| | | | | |
|---|---|---|---|---|
| 4,723,973 | A * | 2/1988 | Oyobe et al. | 55/466 |
| 4,781,175 | A * | 11/1988 | McGreevy et al. | 606/40 |
| 4,924,061 | A * | 5/1990 | Labat | H05H 1/46 219/121.48 |
| 4,956,102 | A * | 9/1990 | Allsing | B01D 33/0016 210/402 |
| 5,069,696 | A * | 12/1991 | Bruno, III | 55/476 |
| 5,114,447 | A * | 5/1992 | Davis | 55/485 |
| 5,145,496 | A * | 9/1992 | Mellen | B01D 46/0046 55/302 |
| 5,225,657 | A * | 7/1993 | Blankenship | H05H 1/34 219/121.39 |
| 5,478,377 | A * | 12/1995 | Scavnicky et al. | 96/17 |
| 5,685,985 | A * | 11/1997 | Brown et al. | 210/450 |
| 5,772,102 | A * | 6/1998 | New et al. | 228/42 |
| 5,846,271 | A * | 12/1998 | Flynn et al. | 55/315 |
| 6,068,762 | A * | 5/2000 | Stone et al. | 210/90 |
| 6,329,625 | B1 * | 12/2001 | Quick | B01D 29/111 210/493.2 |
| 6,712,869 | B2 * | 3/2004 | Cheng et al. | 55/418 |
| 6,809,286 | B2 | 10/2004 | Piechowski et al. | |
| 7,458,316 | B2 * | 12/2008 | Scelza | A47J 31/005 126/609 |
| 8,029,587 | B2 * | 10/2011 | Kaneko et al. | 55/418 |
| 2002/0046555 | A1 * | 4/2002 | Sherwood, Jr. | 55/482 |
| 2003/0010247 | A1 * | 1/2003 | Miyaji | B60R 21/2644 102/530 |
| 2003/0192292 | A1 * | 10/2003 | Seedorf | 55/493 |
| 2004/0031841 | A1 * | 2/2004 | Piechowski | B23K 9/324 228/219 |
| 2005/0127038 | A1 * | 6/2005 | Tannous et al. | 216/62 |
| 2005/0178716 | A1 * | 8/2005 | Suri | 210/437 |
| 2005/0252890 | A1 * | 11/2005 | Stanzel et al. | 219/74 |
| 2005/0279735 | A1 * | 12/2005 | Delgado | B23K 9/167 219/75 |
| 2007/0044577 | A1 * | 3/2007 | Trakumas et al. | 73/863.22 |
| 2008/0105668 | A1 * | 5/2008 | Giese | 219/137.42 |
| 2009/0159577 | A1 * | 6/2009 | Sommerfeld | 219/121.55 |
| 2011/0036815 | A1 * | 2/2011 | Zamuner | 219/74 |
| 2011/0173934 | A1 * | 7/2011 | Burns et al. | 55/307 |

OTHER PUBLICATIONS

International Search Report from PCT application No. PCT/US2013/022854 dated May 14, 2013, 13 pgs.

\* cited by examiner

AUXILIARY SHIELDING GAS FILTER FOR A WELDING APPARATUS

BACKGROUND

The invention relates generally to welding apparatus and, more particularly, to a shielding gas filter for a welding apparatus.

Welding is a process that has increasingly become ubiquitous in various industries and applications. Such processes may be automated in certain contexts, although a large number of applications continue to exist for manual welding operations. In both cases, such welding operations rely on a variety of types of equipment to ensure the supply of welding consumables (e.g., wire feed, shielding gas, etc.) is provided to the weld in an appropriate amount at the desired time. For example, a gas supply coupled to a gas valve may be used to selectively provide shielding gas to a welding operation.

In welding applications employing shielding gas, a flexible gas hose may couple a gas supply cylinder or bulk mixing system to a welding device (e.g., welding power supply, wire feeder, pendant, etc.). The flexible gas hose directs the shielding gas to a gas valve which thereby controls the flow of shielding gas to the welding operation. Dust, debris, or other contaminants may enter the flexible gas hose and become lodged in the gas valve. Such contaminants may inhibit the gas valve from operating properly. To limit contaminants from affecting the operation of the gas valve, a filter may be used to block certain particles in the shielding gas from entering the gas valve. Unfortunately, the filter may become clogged by the particles and, therefore, may need to be occasionally cleaned and/or replaced. However, in certain configurations, the construction of a filter assembly makes the filter difficult to replace or clean. As such, the filter may be rendered unusable (e.g., defeated or punctured) when attempts are made to access or clean the filter. For example, a tool may be directed towards the filter to remove the filter and/or to remove debris from the filter. The tool may inadvertently puncture a hole in the filter resulting in a filter that no longer blocks particles from entering the gas valve. Accordingly, there exists a need in the field for filter assemblies that enable a filter to be easily cleaned and/or replaced without compromising the integrity of the filter.

BRIEF DESCRIPTION

In one embodiment, a shielding gas filter assembly for a welding apparatus includes a filter housing having a filter disposed therein. The filter assembly also includes a filter guard coupled to the filter housing and configured to receive shielding gas. The filter guard includes a tamper resistant portion configured to inhibit an object from contacting the filter when the object is inserted into the filter guard.

In another embodiment, a welding apparatus includes a gas valve configured to selectively allow welding gas to flow to a welding application. The welding apparatus also includes a shielding gas filter assembly fluidly coupled to the gas valve and configured to prevent particles from entering the gas valve. The shielding gas filter assembly includes a tamper resistant portion configured to inhibit objects inserted into the shielding gas filter assembly from touching a filter screen within the shielding gas filter assembly.

In another embodiment, a shielding gas filter assembly for a welding apparatus includes a housing having an inlet configured to receive shielding gas from a shielding gas source and an outlet configured to direct the shielding gas to a welding apparatus. The welding apparatus also includes a shielding gas passageway extending through the housing between the inlet and the outlet. The welding apparatus includes a filter screen disposed within the shielding gas passageway and configured to inhibit particles from passing through the filter screen. The welding apparatus also includes a tamper resistant device disposed within the shielding gas passageway between the inlet and the filter screen. The tamper resistant device is configured to receive shielding gas into the tamper resistant device axially and to direct shielding gas out of the tamper resistant device radially. The tamper resistant device is configured to inhibit objects inserted into the inlet of the housing from touching the filter screen.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
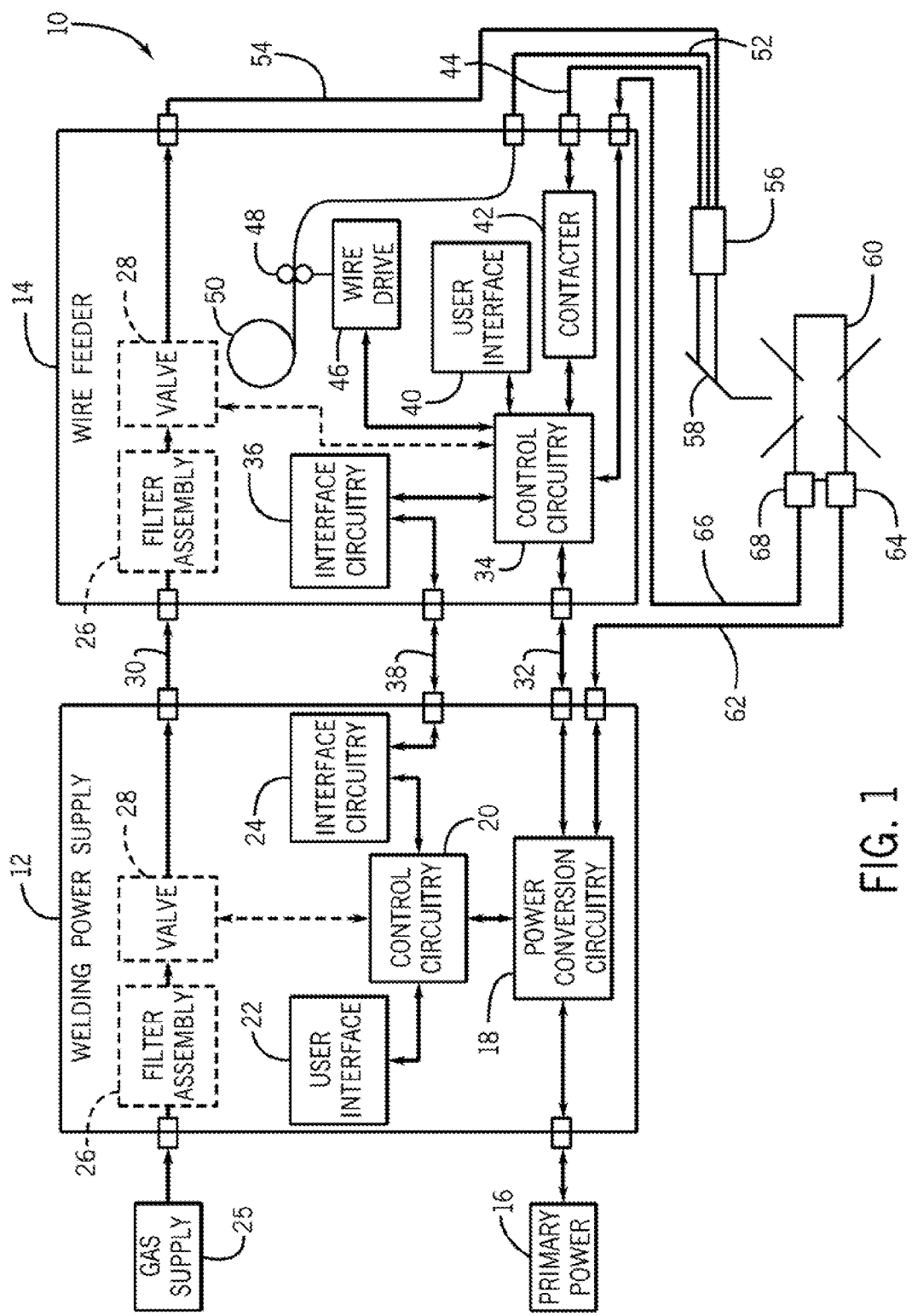
FIG. 1 is a block diagram of an embodiment of a welding system employing a filter assembly in accordance with aspects of the present disclosure.

Turning now to the drawings, FIG. 1 is a block diagram of an embodiment of a welding system 10 with a filter assembly. In the illustrated embodiment, the welding system 10 is a metal inert gas (MIG) welding system, although the present techniques may be used on other welding systems utilizing shielding gas, such as tungsten inert gas (TIG) systems, and so forth. The welding system 10 powers, controls, and supplies consumables to a welding application. The welding system 10 includes a welding power supply 12 and a voltage sensing wire feeder 14.

The welding power supply 12 receives primary power 16 (e.g., from the AC power grid, an engine/generator set, a battery, or other energy generating or storage devices, or a combination thereof), conditions the primary power, and provides an output power to one or more welding devices in accordance with demands of the system 10. The primary power 16 may be supplied from an offsite location (i.e., the primary power may originate from the power grid). Accordingly, the welding power supply 12 includes power conversion circuitry 18 that may include circuit elements such as transformers, rectifiers, switches, and so forth, capable of converting the AC input power to AC or DC output power as dictated by the demands of the system 10 (e.g., particular welding processes and regimes). Such circuits are generally known in the art.

In some embodiments, the power conversion circuitry 18 may be configured to convert the primary power 16 to both weld and auxiliary power outputs. However, in other embodiments, the power conversion circuitry 18 may be adapted to convert primary power only to a weld power output, and a separate auxiliary converter may be provided to convert primary power to auxiliary power. Still further, in some embodiments, the welding power supply 12 may be adapted to receive a converted auxiliary power output directly from a wall outlet. Indeed, any suitable power conversion system or mechanism may be employed by the welding power supply 12 to generate and supply both weld and auxiliary power.

The welding power supply 12 includes control circuitry 20. The control circuitry 20 includes at least one controller that controls the operations of the welding power supply 12, and may be configured to receive and process a plurality of inputs regarding the performance and demands of the system 10. Furthermore, the control circuitry 20 may include volatile or non-volatile memory, such as ROM, RAM, magnetic storage memory, optical storage memory, or a combination thereof. In addition, a variety of control regimes for various welding processes, along with associated settings and parameters may be stored in the memory along with code configured to provide a specific output (e.g., initiate wire feed, enable gas flow, etc.) during operation.

The welding power supply 12 includes a user interface 22. The control circuitry 20 may receive input from the user interface 22 through which a user may choose a process, and input desired parameters (e.g., voltages, currents, particular pulsed or non-pulsed welding regimes, and so forth). Furthermore, the control circuitry 20 may control parameters input by the user as well as any other parameters. Specifically, the user interface 22 may include a display for presenting, or indicating, information to an operator. The control circuitry 20 uses interface circuitry 24 for communicating data to other devices in the system 10, such as the wire feeder 14.

A gas supply 25 provides shielding gases, such as argon, helium, carbon dioxide, and so forth, depending upon the welding application. The shielding gas is filtered by a filter assembly 26 before flowing to a valve 28. As discussed in detail below, the filter assembly 26 may be constructed to remove contaminants (e.g., grinding debris, sand, etc.), to be easily replace an internal filter, to clean the internal filter without defeating the filter, to inhibit gas surges, and to become plugged less frequently than other filters having a smaller diameter. The valve 28 controls the flow of gas, and if desired, may be selected to allow for modulating or regulating the amount of gas supplied to a welding operation. The valve 28 may be opened, closed, or otherwise operated by the control circuitry 20 to enable, inhibit, or control gas flow through the valve 28. For example, when the valve 28 is closed, shielding gas may be inhibited from flowing through the valve 28. Conversely, when the valve 28 is opened, shielding gas is enabled to flow through the valve 28.

Shielding gas exits the valve 28 and flows through a cable or hose 30 (which in some implementations may be packaged with the welding power output) to the wire feeder 14 which provides the shielding gas to the welding operation. As illustrated, the filter assembly 26 and the valve 28 may be part of the welding power supply 12, the wire feeder 14, or in some combination of the two. In certain embodiments, the filter assembly 26 and/or the valve 28 may be part of a torch assembly, a pendant, or some other welding device. Further, the filter assembly 26 and/or the valve 28 may be externally coupled to a welding device or mounted inside the welding device.

Welding power flows through a cable 32 to the wire feeder 14. The wire feeder 14 may use the welding power to power the various components in the wire feeder 14, such as to power control circuitry 34. The control circuitry 34 controls the operations of the wire feeder 14. The wire feeder 14 also includes interface circuitry 36 for communicating with the welding power supply 12 using a cable 38. In some embodiments, welding power and data may use the same cable between the welding power supply 12 and the wire feeder 14. Further, in other embodiments, power may be provided to the wire feeder 14 through the cable 38.

The wire feeder 14 includes a user interface 40. The control circuitry 34 may receive input from the user interface 40, such as via methods and devices described in relation to the user interface 22. Furthermore, the control circuitry 34 may display information to an operator, such as voltage, current, wire speed, wire type, and so forth. A contactor 42 (e.g., high amperage relay) is controlled by the control circuitry 34 and configured to enable or inhibit welding power to flow to a weld power cable 44 for the welding operation. In certain embodiments, the contactor 42 may be an electromechanical device, while in other embodiments the contactor 42 may be any other suitable device, such as a solid state device. The wire feeder 14 includes a wire drive 46 that receives control signals from the control circuit 34 to drive rollers 48 that rotate to pull wire off a wire spool 50. The wire is provided to the welding operation through a cable 52. Likewise, the wire feeder 14 may provide shielding gas through a cable 54. As may be appreciated, the cables 44, 52, and 54 may be bundled together with a coupling device 56.

A torch 58 uses the wire, welding power, and shielding gas for a welding operation. Further, the torch 58 is used to establish a welding arc between the torch 58 and a workpiece 60. A work cable 62, which may be terminated with a clamp 64 (or another power connecting device), couples the welding power supply 12 to the workpiece 60 to complete a welding power circuit. As illustrated, a voltage sense cable 66 is coupled from the wire feeder 14 to the workpiece 60 using a sense clamp 68 (or another power connecting mechanism). The wire feeder 14 is connected to the welding power supply 12 so that it may operate even when a welding arc is not formed by the torch 58. Specifically, the wire feeder 14 receives welding power from the welding power supply 12 through cable 32. However, in certain embodiments, the wire feeder 14 may be powered through the cable 38. Further, in such embodiments, the voltage sense cable 68 may be replaced by wiring within cable 38. The welding power is connected to the various components in the wire feeder 14 (e.g., control circuitry 34, wire drive 46, user interface 40, interface circuitry 36). A return path for the wire feeder 14 power is formed using the sense cable 66 with the sense clamp 68 connected to the workpiece 60. Further, the work cable 62 with the work clamp 64 provide the final portion of the return path to the welding power supply 12. Thus, the return path includes the cable 66, the workpiece 60, and the cable 62.

Figure 2:
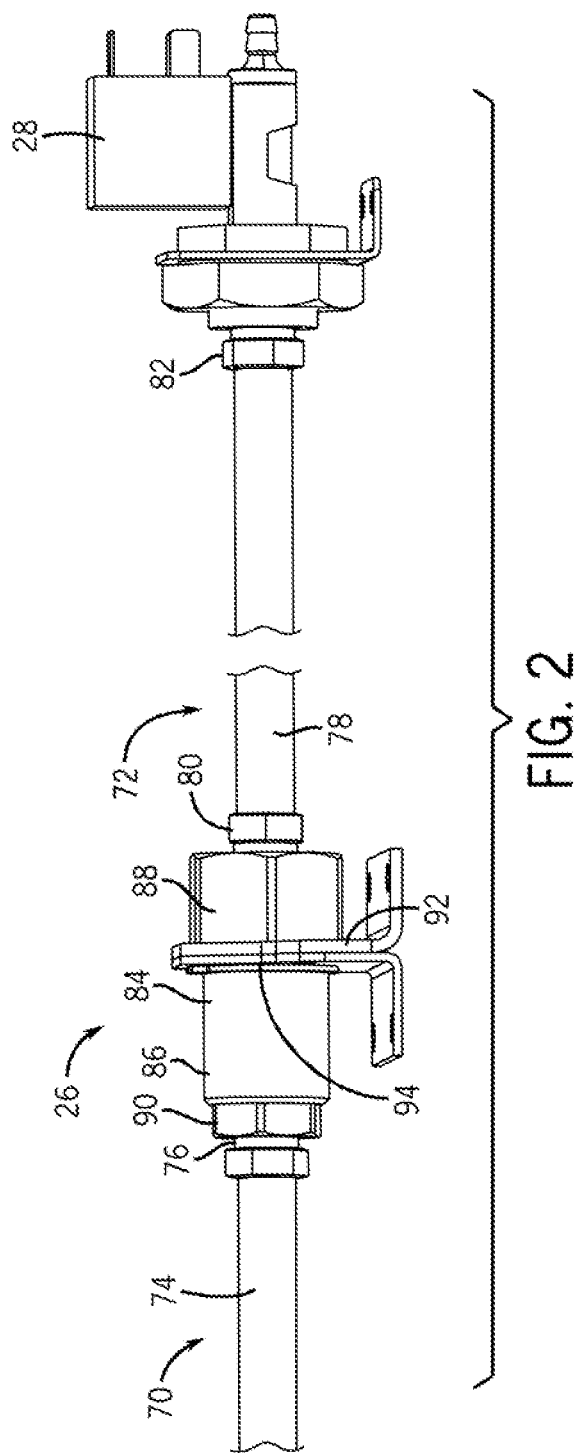
FIG. 2 is a side view of an embodiment of a filter assembly in accordance with aspects of the present disclosure.

FIG. 2 is a side view of an embodiment of the filter assembly 26. As illustrated, a first gas hose assembly 70 is attached to the filter assembly 26 and allows shielding gas to flow to the filter assembly 26. Further, a second gas hose assembly 72 is attached between the filter assembly 26 and the valve 28 and allows shielding gas to flow from the filter assembly 26 to the valve 28. The first gas hose assembly 70 includes a gas hose 74 coupled to a connector 76. The connector 76 is mated with an inlet port of the filter assembly 26. Further, the second gas hose assembly 72 includes a gas hose 78 coupled to connectors 80 and 82. The connector 80 is mated with an outlet port of the filter assembly 26 and the connector 82 is mated with an inlet port of the valve 28. Thus, shielding gas may flow through the first gas hose assembly 70, through the filter assembly 26, and through the second gas hose assembly 72 to the valve 28. Shielding gas may be selectively controlled to flow through the valve 28 to a welding application.

The filter assembly 26 filters particles to inhibit the particles from flowing into the valve 28. Specifically, the filter assembly 26 includes a gas filter block 84 having a filter housing portion 86 and a hex nut 88. The filter housing portion 86 includes a screen or filter for blocking contaminants from flowing to the valve 28. The hex nut 88 is used for mounting the gas filter block 84. Further, a filter guard 90 is inserted into the gas filter block 84 and protects the filter from being inadvertently defeated (e.g., punctured). The gas filter block 84 is mounted to a mounting bracket 92 using a retaining ring 94 (e.g., or another locking device). The retaining ring 94 and the hex nut 88 secure the gas filter block 84 to the mounting bracket 92.

Figure 3:
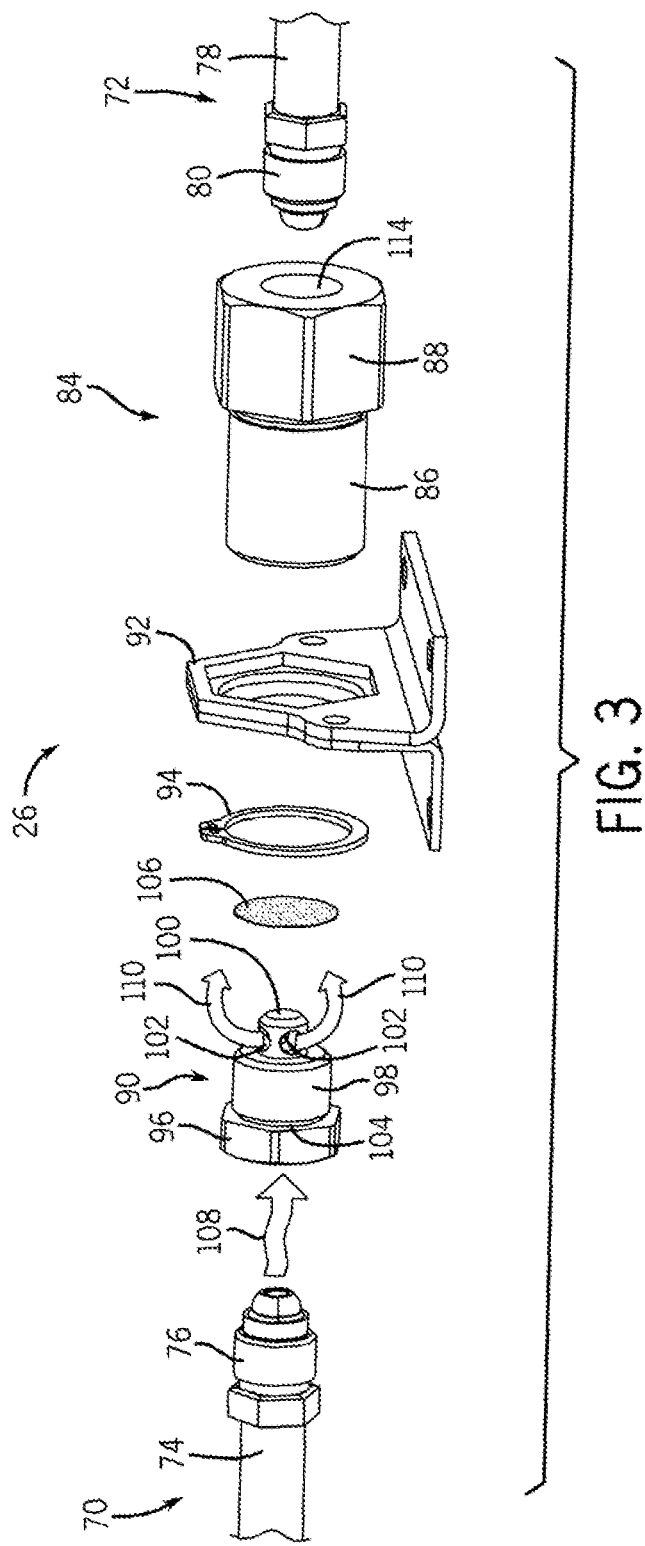
FIG. 3 is an exploded view of an embodiment of the filter assembly of FIG. 2.

FIG. 3 is an exploded view of an embodiment of the filter assembly 26 of FIG. 2. The filter guard 90 includes a locking nut 96 for securing the filter guard 90 within the gas filter block 84. Further, the filter guard 90 includes a body or nozzle portion 98. As will be appreciated, the nozzle portion 98 of the filter guard 90 may be threaded for attaching the filter guard 90 inside the gas filter block 84. Adjacent to the nozzle portion 98, the filter guard 90 includes a tamper resistant portion 100 that allows axial entry of shielding gas. Shielding gas exits the tamper resistant portion 100 radially through openings 102 (e.g., radial gas exit portions). An o-ring 104 surrounds the nozzle portion 98 of the filter guard 90 to provide a seal. When assembled, the o-ring 104 abuts an inner circumference of the filter housing 86.

A screen or filter 106 is positioned within the filter housing 86 to block particles, debris, or other contaminants from flowing to the valve 28. In certain embodiments, the filter 106 may have an outer diameter greater than the inner diameter of the filter housing 86. In such embodiments, the filter 106 may be press fit into the filter housing 86 causing the filter 106 to have a concave shape when installed. For example, the filter 106 may have an outer diameter that is approximately 0.8 inches, while the filter housing 86 may have an inner diameter of 0.7 inches. A large filter size (e.g., 0.8 inch diameter) may allow a greater time between filter cleaning and/or filter replacement when compared to smaller filter sizes. The filter 106 may be formed using a mesh material, such as a 150×150 mesh material, or another suitable material. Although the filter 106 is shown as being circular, in some embodiments, the filter 106 may be tubular, or some other shape. For example, a tubular filter may be installed around the tamper resistant portion 100 of the filter guard 90 so that shielding gas flowing out of the openings 102 is filtered after exiting through the openings 102.

To assemble the filter assembly 26, the filter 106 is inserted into the filter housing 86 and pressed against a filter wall. The gas filter block 84 is attached to the bracket 92 using the hex nut 88 and the retaining ring 94. In certain embodiments, the bracket 92 includes a hex opening that matches the size of the hex nut 88 to aid in assembly. Further, the gas filter block 84 includes a cavity which the retaining ring 94 may fit within. The filter guard 90 is attached inside the gas filter block 84. The first gas hose assembly 70 may be attached to the inlet port of the filter assembly 26 and the second gas hose assembly 72 may be attached to the outlet port of the filter assembly 26. With the filter assembly 26 constructed as described, the filter 106 may remove contaminants, be easily replaced or cleaned without defeating the filter 106, inhibit gas surges, and become plugged less frequently than filters having a smaller diameter.

During operation, shielding gas flows through the first gas hose assembly 70. The shielding gas exits through the connector 76 and flows axially into the filter guard 90 as shown by arrow 108. The shielding gas enters the tamper resistant portion 100 axially, then exits radially through the openings 102 as shown by arrows 110. The shielding gas then flows through the filter 106 within the gas filter block 84. The shielding gas exits the gas filter block 84 through an outlet port 114 which directs the shielding gas through the second gas hose assembly 72 to the valve 28.

When the filter assembly 26 is assembled, the first gas hose assembly 70 is removed for cleaning and/or replacing the filter 106. As will be appreciated, the shape of the filter guard 90 inhibits an object from contacting the filter 106 when the object is inserted into the filter guard 90. For example, if a finger is inserted into the filter guard 90 (from the left side of the filter guard 90 as illustrated), the tamper resistant portion 100 will block the finger from contacting the filter 106. As another example, if a tool (e.g., screwdriver, wire, etc.) is inserted into the filter guard 90 (from the left side of the filter guard 90 as illustrated), the tamper resistant portion 100 will block the tool from contacting the filter 106. Therefore, to clean, remove, or otherwise access the filter 106, the filter guard 90 is first removed. Thus, with the filter guard 90 installed, the filter 106 is inhibited from being defeated (e.g., punctured) by insertion of an object into the filter guard 90.

Figure 4:
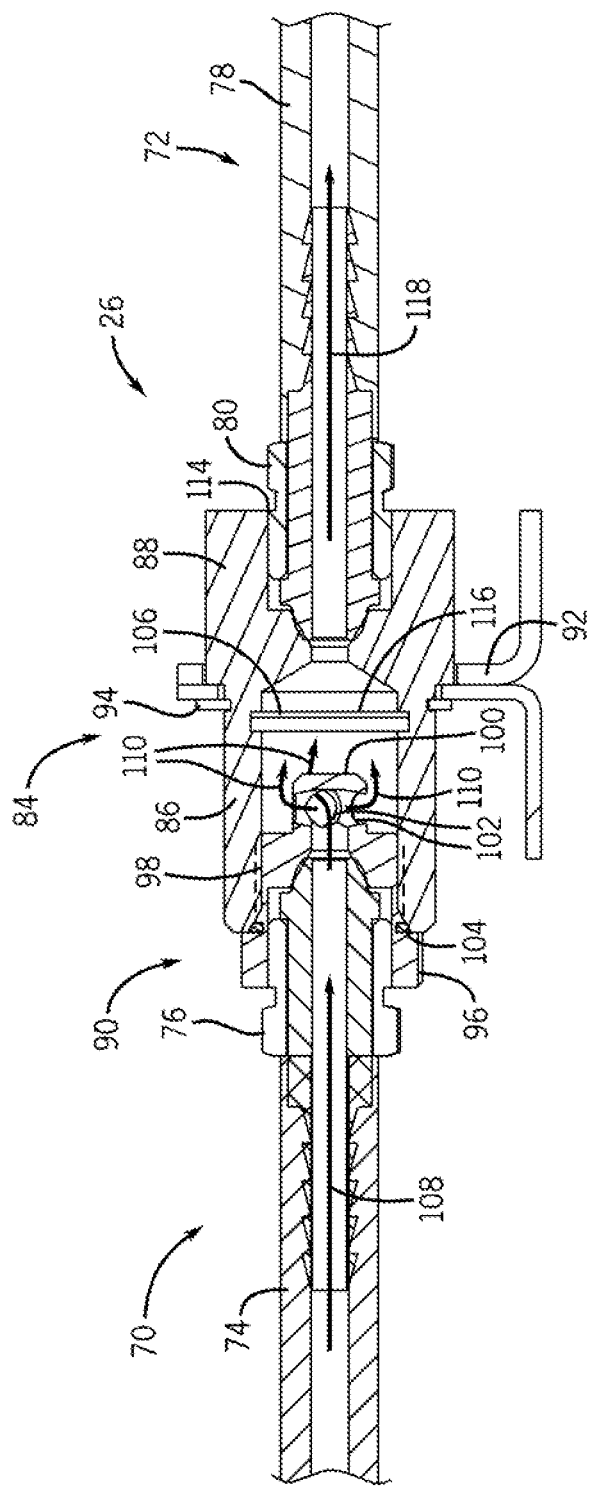
FIG. 4 is a cross-sectional view of an embodiment of the filter assembly of FIG. 2.

FIG. 4 is a cross-sectional view of an embodiment of the filter assembly 26 of FIG. 2. As illustrated, the filter 106 is disposed inside the filter housing 86 and abuts a filter wall 116. The filter wall 116 hold the filter 106 in place within the gas filter block 84. During operation, shielding gas flows axially through the first gas hose assembly 70 as shown by the arrow 108. The shielding gas flows axially through the tamper resistant portion 100 of the filter guard 90, then exits the tamper resistant portion 100 radially through the openings 102 as shown by the arrows 110. The shielding gas then flows through the filter 106 and through the second gas hose assembly 72 as shown by arrow 118. Thus, filtered shielding gas is supplied to the valve 28.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A shielding gas filter assembly for a metal inert gas welding apparatus comprising:
   a filter housing configured to be coupled between first and second shielding gas conduits and having a filter disposed across an entire diameter of the filter transverse to an axial direction of the filter housing therein to block contaminants from flowing in the axial direction throughout the entire diameter of the filter from the first shielding gas conduit to the second shielding gas conduit through the filter housing; and
   a removable filter guard disposed in the filter housing and configured to receive shielding gas from the first shielding gas conduit while the first shielding gas conduit is coupled to the filter housing, the removable filter guard comprising a locking nut on a first end of the removable filter guard, a nozzle portion, and a tamper resistant portion on a second end of the removable filter guard, wherein the second end of the removable filter guard is opposite the first end of the removable filter guard, wherein the tamper resistant portion is configured to inhibit an object from contacting the filter when the object is inserted into the removable filter guard in the axial direction while the first shielding gas conduit is removed and to enable flow of shielding gas from the first shielding gas conduit through the removable filter guard and into the second shielding gas conduit while the first shielding gas conduit is coupled to the filter housing, wherein the locking nut of the removable filter guard is configured to secure the second end of the removable filter guard within an interior of the filter housing, and wherein an interior of the removable filter guard is configured to couple to a connector of the first shielding gas conduit through the first end of the removable filter guard to enable flow of shielding gas from the first shielding gas conduit into the first end of the removable filter guard.

2. The shielding gas filter assembly of claim 1, wherein the filter housing comprises an output port configured to be fluidly coupled to the second shielding gas conduit and to direct the shielding gas into the second shielding gas conduit.

3. The shielding gas filter assembly of claim 1, wherein the removable filter guard comprises an inlet port configured to be fluidly coupled to the first shielding gas conduit on the interior of the removable filter guard and to receive the shielding gas from the first shielding gas conduit.

4. The shielding gas filter assembly of claim 1, wherein the tamper resistant portion of the removable filter guard comprises an axial gas entry portion configured to receive shielding gas into the tamper resistant portion and radial gas exit portions configured to direct shielding gas out of the tamper resistant portion.

5. The shielding gas filter assembly of claim 1, comprising a mounting bracket disposed around the filter housing and configured to secure the filter housing to the metal inert gas welding apparatus.

6. The shielding gas filter assembly of claim 5, comprising a locking device secured to the filter housing for holding the filter housing within the mounting bracket.

7. The shielding gas filter assembly of claim 1, wherein the filter comprises an outer diameter greater than an inner diameter of the filter housing.

8. The shielding gas filter assembly of claim 1, wherein the filter is disposed within the filter housing adjacent to a filter wall.

9. The shielding gas filter assembly of claim 1, wherein the filter comprises a concave shape when installed within the filter housing.

10. A shielding gas filter assembly for a metal inert gas welding apparatus comprising:
a first shielding gas conduit having a first connector;
a second shielding gas conduit having a second connector on a first end of the second shielding gas conduit and a valve on a second end of the second shielding gas conduit;
a filter housing configured to be coupled between the first and second shielding gas conduits and having a filter disposed across an entire diameter of the filter transverse to an axial direction of the filter housing therein to block contaminants from flowing in the axial direction throughout the entire diameter of the filter from the first shielding gas conduit to the second shielding gas conduit through the filter housing into the valve; and
a removable filter guard disposed in the filter housing and configured to receive shielding gas from the first shielding gas conduit while the first shielding gas conduit is coupled to the filter housing, the removable filter guard comprising a locking nut on a first end of the removable filter guard, a nozzle portion, and a tamper resistant portion on a second end of the removable filter guard, wherein the second end of the removable filter guard is opposite the first end of the removable filter guard, wherein the tamper resistant portion is configured to inhibit an object from contacting the filter when the object is inserted into the removable filter guard in the axial direction while the first shielding gas conduit is removed and to enable flow of shielding gas from the first shielding gas conduit through the removable filter guard and into the second shielding gas conduit while the first shielding gas conduit is coupled to the filter housing, wherein the tamper resistant portion of the removable filter guard comprises an axial gas entry portion configured to receive shielding gas into the tamper resistant portion and radial gas exit portions configured to direct shielding gas out of the tamper resistant portion, wherein the locking nut is configured to secure the second end of the removable filter guard within an interior of the filter housing, and wherein an interior of the nozzle portion of the removable filter guard is configured to couple to the first connector through the locking nut to enable flow of shielding gas from the first shielding gas conduit into the first end of the removable filter guard.

11. The shielding gas filter assembly of claim 10, wherein the filter housing comprises an output port configured to be fluidly coupled to the second shielding gas conduit and to direct the shielding gas into the second shielding gas conduit.

12. The shielding gas filter assembly of claim 10, wherein the removable filter guard comprises an inlet port configured to be fluidly coupled to the first shielding gas conduit on the interior of the removable filter guard and to receive the shielding gas from the first shielding gas conduit.

13. The shielding gas filter assembly of claim 10, comprising a mounting bracket disposed around the filter housing and configured to secure the filter housing to the metal inert gas welding apparatus.

14. The shielding gas filter assembly of claim 13, comprising a locking device secured to the filter housing for holding the filter housing within the mounting bracket.

15. The shielding gas filter assembly of claim 10, wherein the filter comprises an outer diameter greater than an inner diameter of the filter housing.

16. The shielding gas filter assembly of claim 10, wherein the filter is disposed within the filter housing adjacent to a filter wall.

17. The shielding gas filter assembly of claim 10, wherein the filter comprises a concave shape when installed within the filter housing.

18. A shielding gas filter assembly for a metal inert gas welding apparatus comprising:
a filter housing configured to be coupled between first and second welding shielding gas conduits and having a filter disposed across an entire diameter of the filter transverse to an axial direction of the filter housing therein to block contaminants from flowing in the axial direction throughout the entire diameter of the filter from the first welding shielding gas conduit to the second welding shielding gas conduit through the filter housing; and a removable filter guard coupled to the filter housing and configured to receive shielding gas from the first welding shielding gas conduit while the first welding shielding gas conduit is coupled to the filter housing, the removable filter guard comprising a locking nut on a first end of the removable filter guard, a generally tube-like extension having an axial gas entry portion configured to receive shielding gas and radial gas exit portions configured to direct shielding gas out of the generally tube-like extension, and a blind end on a second end of the removable filter guard, wherein the second end of the removable filter guard is opposite the first end of the removable filter guard, wherein the blind end is configured to inhibit an object inserted into the removable filter guard from contacting the filter in the axial direction while the first welding shielding gas conduit is removed and to enable flow of shielding gas from the first welding shielding gas conduit through the removable filter guard and into the second welding shielding gas conduit while the first welding shielding gas conduit is coupled to the filter housing, wherein the locking nut of the removable filter guard is configured to secure the second end of the removable filter guard within an interior of the filter housing, and wherein an interior of the removable filter guard is configured to couple to a connector of the first welding shielding gas conduit through the first end of the removable filter guard to enable flow of shielding gas from the first welding shielding gas conduit into the first end the removable filter guard.

19. The shielding gas filter assembly of claim 18, wherein the filter housing comprises an output port configured to be fluidly coupled to the second welding shielding gas conduit and to direct the shielding gas into the second welding shielding gas conduit.

20. The shielding gas filter assembly of claim 18, wherein the removable filter guard comprises an inlet port configured to be fluidly coupled to the first welding shielding gas conduit on the interior of the removable filter guard and to receive the shielding gas from the first welding shielding gas conduit.

* * * * *